UNITED STATES PATENT OFFICE.

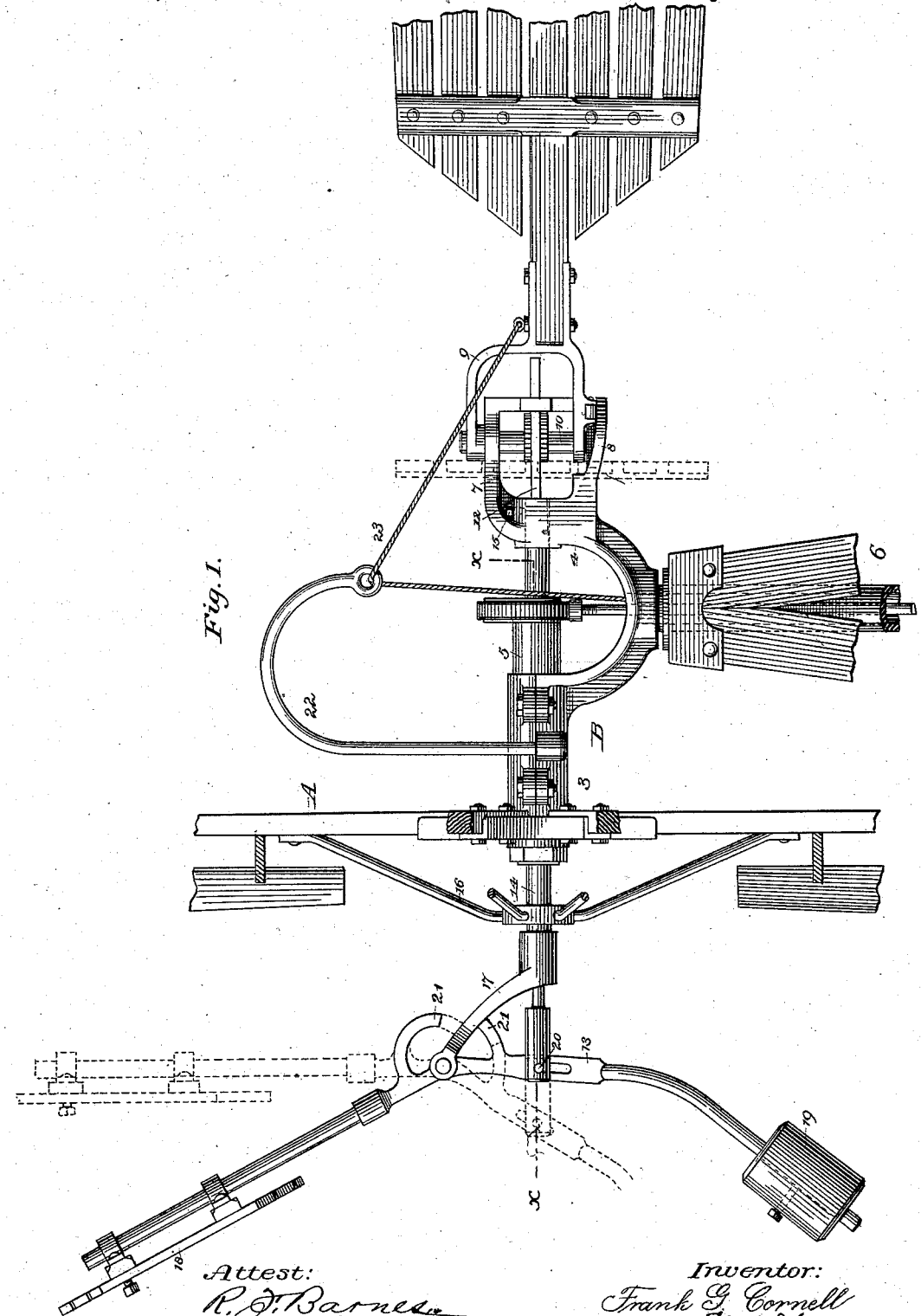

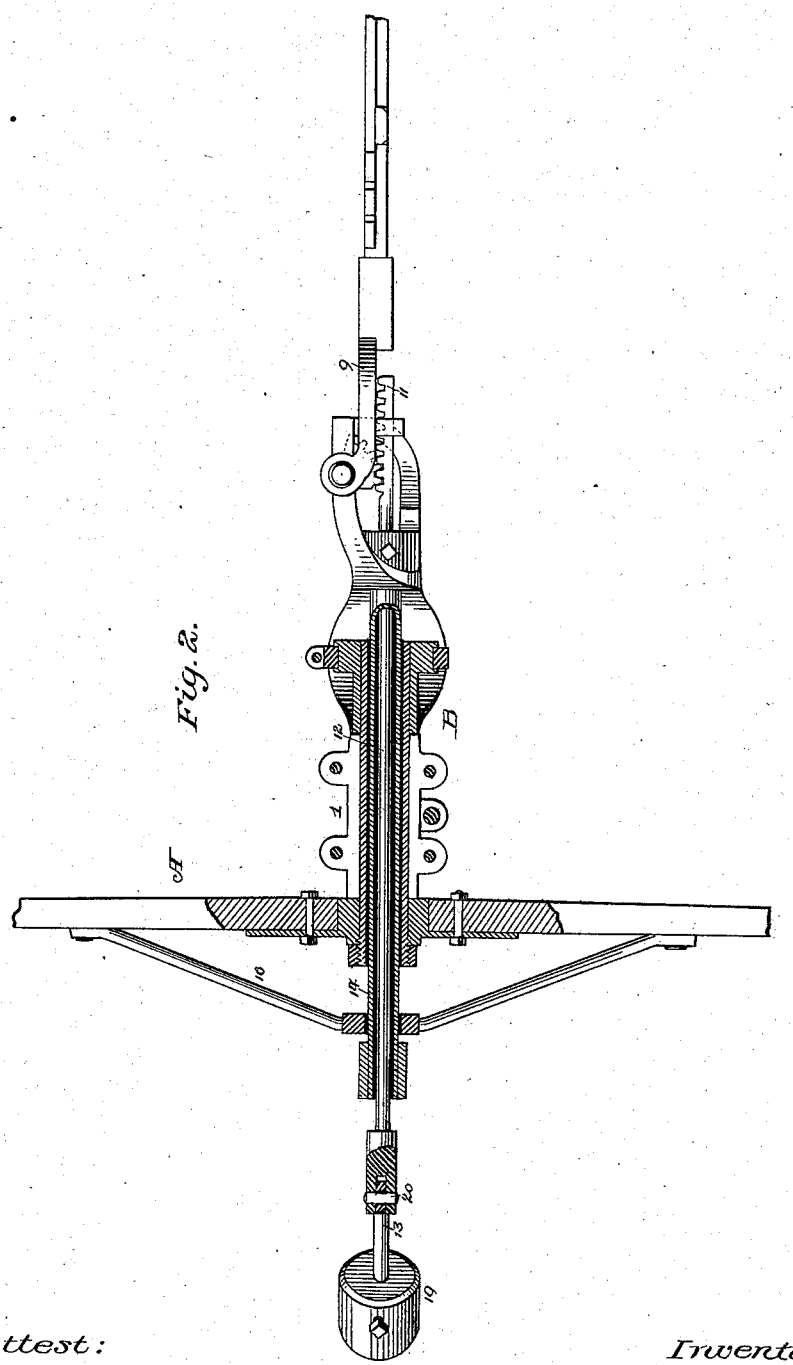

FRANK G. CORNELL, OF GRAND RAPIDS, MICHIGAN, ASSIGNOR TO THE CORNELL MANUFACTURING COMPANY, OF MICHIGAN.

WIND-WHEEL.

SPECIFICATION forming part of Letters Patent No. 261,684, dated July 25, 1882.

Application filed February 16, 1881. (Model.)

*To all whom it may concern:*

Be it known that I, FRANK G. CORNELL, of Grand Rapids, in the county of Kent and State of Michigan, have invented a new and useful Improvement in Windmills; and I do hereby declare that the following is a full, clear, and exact description of the same.

My invention relates to windmills of that class in which a solid wheel is combined with a hinged steering-vane and with a regulating-vane for changing the direction of the steering-vane, and thereby turning the wheel more or less out of the wind, according to the pressure.

It consists, first, of a solid wheel provided with a hinged tail-vane and with a regulating-vane in front of said wheel, said regulating-vane operating the tail-vane by means of an axial rod or other intermediate connections.

It consists, also, of certain details of construction, all as hereinafter fully set forth, and specified in the claims.

In the accompanying drawings, Figure 1 is a side elevation. Fig. 2 represents a horizontal section on line *x x* of Fig. 1.

Heretofore various forms of hinged tail or steering vanes have been used in connection with solid wind-wheels to turn them out of the wind, and various means have been used to connect such vanes to the regulating-vanes. The regulating-vanes have also been placed in various positions in relation to the main wheel. Some of these solid wheels have been provided with two steering-vanes arranged one at right angles and the other in line with the axis of the main wheel, and regulating the direction of the wheel by turning axially, so as to expose side and edge alternately to the wind. Such a wheel is shown in the patent of McGovern, granted June 29, 1875. Others have been provided with a single hinged tail-vane arranged in line with the axis of the wheel and in vertical plane, and operated by a regulating-vane placed above the main wheel.

By my new arrangement of the regulating-vane I have sought to simplify the structure and to gain a new or better effect in the action of the machine. The regulating-vane, being placed directly in front of the main wheel, receives the first impulse of the wind, and on the impulse acts first, if the force of the wind be in any excess, to regulate the wheel and place it in proper position to be acted upon by the wind in suitable manner to maintain a uniform motion. The axial arrangement of the rod which communicates motion from the regulating-vane to the tail-vane renders the whole structure simple and compact.

Referring to the drawings, which illustrate the specific construction which represents my invention, it will be observed that the main driving-wheel is represented at A. It is of ordinary construction, with rigid fans, supporting-arms, and annular ribs. The hub of this wheel is keyed to a hollow shaft, 1, or secured in any suitable manner. This shaft 1 has bearings in an arm, 3, of the main casting B. For convenience the bearing is formed in two parts, the upper being connected to the lower by bolts and nuts passing through ears. On the rear end of the shaft is fixed by means of a set-screw a sleeve, 5, carrying the eccentric which overhangs the axial hole in the spindle 6 and operates the reciprocating shaft for the pump or other machine to be operated.

The rear branch, 4, of the casting B has two arms, 7 and 8, turned slightly to one side, and connected to each other at their ends by a vertical bar. Within these arms is pivoted the shaft 9 of the tail-vane by means of a vertical pivot, 10, which turns in the upper and lower arms. The shaft 9 is pronged, as shown in the figure, and these prongs are fixed securely to the pivot 10, one below, so as to rest on the lower arm, and the other preferably above the upper arm, so as to get a more secure connection. The tail-vane may swing on this pivotal connection to a line at right angles to that of the axle of the wheel, or it may be in the line with said axis; but the bar which connects the arms 7 and 8 prevents the tail-vane from swinging beyond the axial line in the direction opposite to that first described.

The lower arm, 8, is formed with its upper surface inclining to the rear, so that the shaft 9 is raised as it is brought around out of line with the axis of the main wheel, and is assisted in movement by its own weight on its return into line with the said axis. To lessen friction the lower prong of the shaft 9 may be provided with a small anti-friction roller bearing upon the inclined back of arm 8.

On the pivot 10, between the prongs of the shaft 9, is fixed a segmental pinion meshing into a rack-bar, 11, and wide enough to permit vertical movement of the pivot without getting out of gear with the said bar. This bar 11 is connected to a rod, 12, which extends through the hollow shaft of the wheel, and is connected upon the front of the wheel with a pivoted lever, 13. The rod 12 passes through the center of a piece of pipe marked 14, the rear end of which rests in the branch 4 of the casting B. It is there held by a set-screw, 15, which depresses the end and holds the opposite end sufficiently raised in order that the hub of a spider, 16, may work freely around it. This spider is fixed axially to the front of the wheel, and serves to steady the tube 14 when the said tube is caused to vibrate in the wind. The front end of the tube 14 supports a bracket, 17, to which is pivoted the arm 13. The upper end of this arm is provided with a regulating-vane, 18, set slightly oblique to the main wheel and nearly in parallel line therewith. The lower end of the lever is provided with an adjustable weight, 19, held upon the lever in any position by a set-screw. The rod 12 is pivoted at 20 to the lever by means of a pin passing through a slot.

It will be observed that the pivot 10 is a little upon one side of the axial line of the main shaft, and the adjustment of the rack-bar upon the segment of the pinion is such that when the regulating-vane is forward and the weight 19 depressed the tail-vane is in the line with the axis of the main wheel; but when the regulating-vane 18 is thrown back by any excess of wind beyond the prescribed force the weight 19 is thrown up and the rod 12 drawn toward the front, which, drawing upon the rack-bar, pulls around the tail-vane, and the amount of deflection of the said tail-vane will depend upon the movement of the regulating-vane 18, and as the regulating-vane 18 is in front of the wheel it is the first to feel any excessive force of wind, and at once gives direction to the tail-vane and deflection to the main wheel.

The motion of the regulating-vane and the weight is limited by stops 21, which come in contact above and below with the brackets 17. They may be provided at the ends with rubber pads to lessen the jar.

A bracket, 22, and cord 23 are provided for drawing the wheel out of line by hand at the will of the operator. The supporting parts in bearings for the spindle for the main casting are of ordinary construction.

Having thus described my invention, what I claim is—

1. In a windmill, the combination of the rigid wind-wheel mounted in front of its bearings, the pivoted tail-vane, and a regulating-vane pivoted in front of the main wheel and connected directly to the tail-vane, whereby the movement of the said regulating-vane under excessive pressure of the wind will turn the tail-vane to one side and tend to throw the wheel out of the wind, substantially as described.

2. The combination of the main casting B, supporting the shaft of the main wheel on one branch and provided with arms 7 and 8 on the other, in combination with the shaft 9 of the tail-vane, the pivot 10, and the rack-and-pinion connection, whereby the said tail-vane is connected to the regulating-vane, substantially as described.

3. The combination, with the main wheel, of the hollow shaft supported in the main casting B, the sleeve 5 and eccentric thereon, the tube 14, and bracket 17, whereby the regulating-vane is supported in front of the main wheel, substantially as described.

4. The combination, with the main shaft, pipe 14, and bracket 17, of the spider 16, substantially as described.

5. The pivoted lever 13, supporting the regulating-vane and having the stops 21 21, in combination with the bracket 17.

In testimony whereof I have signed my name to this specification in the presence of two subscribing witnesses.

FRANK G. CORNELL.

Witnesses:
L. W. SEELY,
D. H. MEAD.